Patented Sept. 1, 1925.

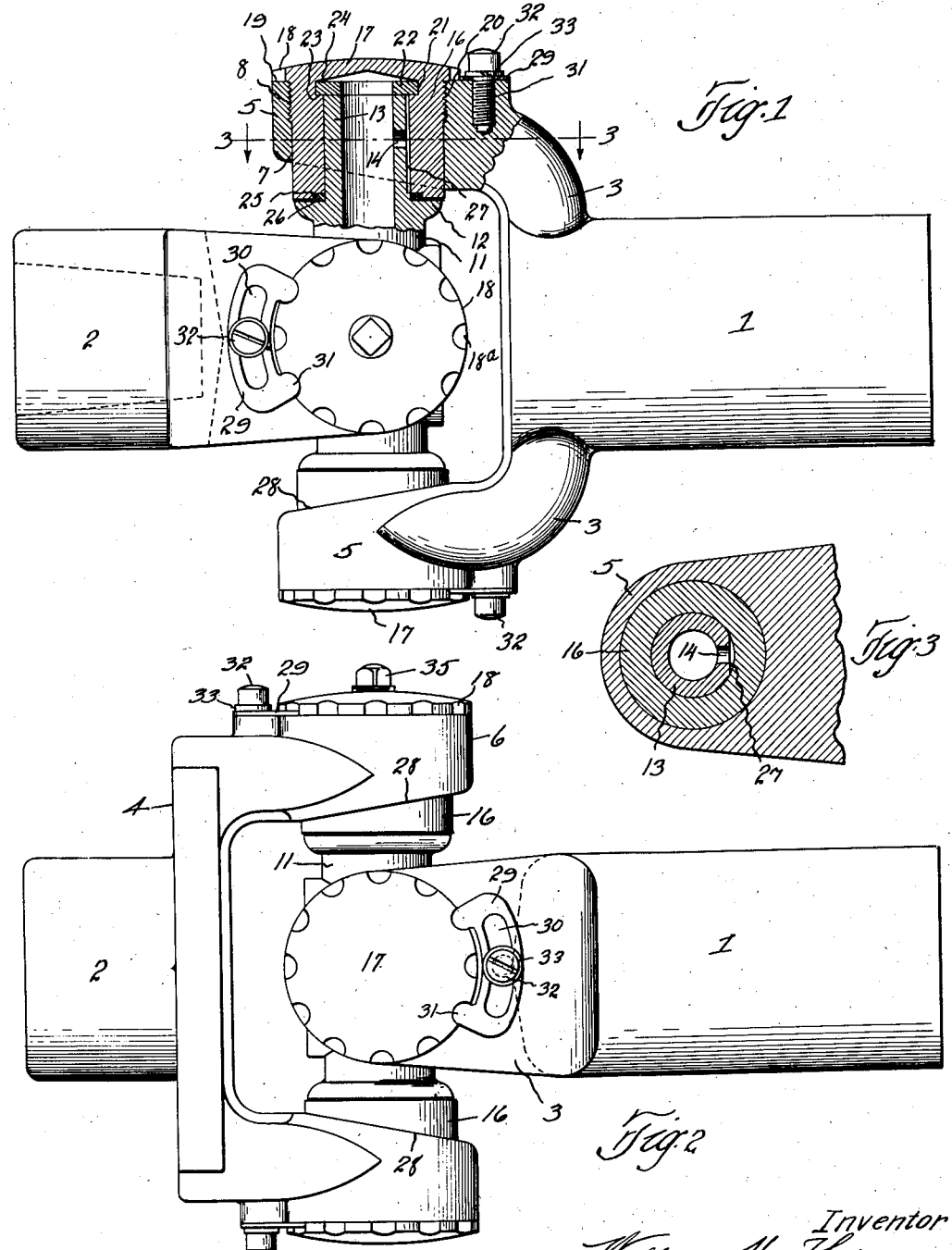

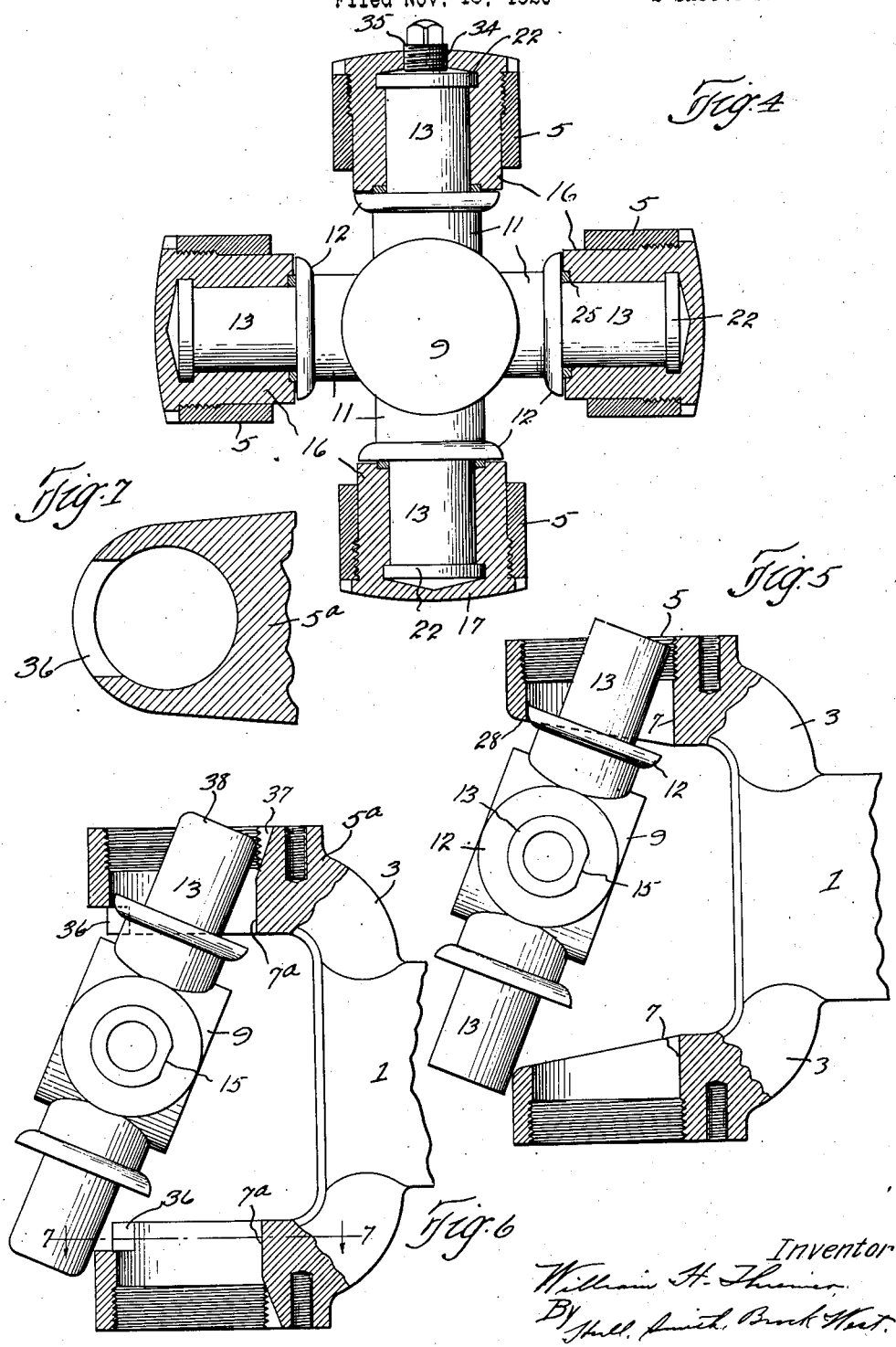

1,552,358

UNITED STATES PATENT OFFICE.

WILLIAM H. THIEMER, OF CLEVELAND, OHIO, ASSIGNOR TO HIMSELF, FREDERICK W. PETERS, AND J. H. WILLS, ALL OF CLEVELAND, OHIO.

UNIVERSAL JOINT.

Application filed November 18, 1920. Serial No. 424,805.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and has for its general object to produce a joint which shall be simple in construction, capable of production in an extremely economical and efficient manner, and which shall be not only efficient in operation but free from defects affecting the practicable and continuous operation of such joints. Further and more limitedly stated, the invention comprises the combinations and arrangements of the parts illustrated and described herein, and embodied in the claims hereto annexed.

In the drawings forming a part hereof, Fig. 1 represents a sectional side elevation of a joint constructed in accordance with my invention; Fig. 2 a similar view taken at right angles to Fig. 1; Fig. 3 a sectional detail corresponding to the line 3—3 of Fig. 1; Fig. 4 a sectional end elevation of such joint; Fig. 5 a detail in section and elevation illustrating the manner of connecting the cross member to one of the yokes; Fig. 6 a view similar to Fig. 5 and illustrating a modification and Fig. 7 a sectional detail corresponding to the line 7—7 of Fig. 6.

Describing the parts by reference characters and with particular relation to Figs. 1 to 5 inclusive, 1 and 2 denote a pair of hubs adapted to be applied to the opposed ends of shaft sections, each hub carrying a yoke comprising a pair of arms 3 and 4, each arm having formed therewith the bearing blocks (5 and 6) for the trunnions of the cross member.

Each hub is formed integrally with its yoke arms, and the bearing blocks for each yoke are provided each with a bore 7 for a bearing bushing. It will be noted that the arms of each pair project nearly parallel with the direction of the hub, the arms and blocks being symmetrical, which enables the bores 7 to be formed by line-reaming the blocks of both arms. That is to say, the journal holes in the blocks may be bored by a single and continuous operation of a single reamer; or by a double reamer on a single arbor, with a suitable pilot or pilots. By the use of two pilots and a single reamer, the second block may be reamed without shifting either the reamer or the work. By the use of a double reamer and a single pilot both blocks may be reamed simultaneously. By line-reaming in this manner, the axes of the bearing bores 7 will be in a true line, thus insuring accuracy of bearing for the trunnions of the cross member and preventing any thrust of such trunnions against the ends of the bores.

After the bearing blocks have been reamed, the bores will be threaded in their exterior portions, as indicated at 8, providing an elongated cylindrical bearing surface in each block extending inwardly from such threaded portion. The cross, indicated generally at 9, is made of one piece and is of the lubricating type, being provided with a central closed receptacle or well 10 from which there project cross arms 11, each having an inwardly rounded shoulder 12 and a reduced hollow trunnion 13. Each hollow trunnion has intermediate of the ends thereof a port 14 extending at its outer end to a flattened surface 15 extending nearly the length of the trunnion.

Each trunnion is mounted within a bushing bearing 16, each having at its outer end a cap 17 provided with a flange 18 adapted to overlie and engage a flat bearing surface 19 upon the outer face of the block 5 and each being provided with an external thread 20 extending inwardly from such cap and of substantially the same length as the threaded portion 8 of its cooperating bearing block. Each bushing also has a long cylindrical surface extending inwardly from the threaded portion 20 and forming an elongated bearing and engaging surface for the corresponding cylindrical portion of its bearing block. This construction of bearing block and bushing secures proper alignment of each bushing in its bearing block and also serves to stiffen and steady each bushing within its block. The outer end of the bore of each bushing bearing is enlarged, as indicated at 21, to provide a seat for a ring 22 of capillary material, such as wicking, said washer extending across the outer end of the trunnion and being seated upon said trunnion and upon a ledge 23 provided outside of the same by such enlargement, and being retained upon said seat by the peripheral portion of the well 24.

Each bushing bearing extends inwardly so as nearly to contact with the outer face of the shoulder 12 on its cooperating arm 11 when the flange 18 is engaged with its seat 19, there being then a slight clearance between such shoulder and the inner end of such bushing. In the inner end of each bushing there is provided an annular recess 25 forming a seat for a washer 26, which may be of ground cork, the washer being of a thickness to bear against the outer face of the shoulder 12 and the annular channel being located at the inner end of the passageway 27 which is provided between the flattened face 15 of the trunnion and the surrounding wall of the bushing.

In the construction of universal joints, it is important that the arms or bearing blocks be not unduly spaced apart and that the diameter of the trunnions is not unduly limited, as such mode of construction will result in weakening these parts. In order to avoid these objections and at the same time permit of a convenient assembly of the cross member with the yoke members, I have beveled the inner face of each bearing block 5, in the manner indicated at 28, so that the distance between the inner faces of such blocks is the greatest at the maximum distance from their hub (1 or 2). The purpose of this construction will be apparent from Fig. 5, wherein the cross member 9 is shown in the position which it must occupy just before the insertion of the trunnions into the bearing blocks 5. The rounding of the inner face of the shoulder 12 enables the cross member to be tilted after the said shoulder has been introduced into the inner end of the bore 7; before the central well 10 shall have encountered the inner face of the bearing block toward which it is moved, the outer end of the opposite trunnion 13 will have cleared the outer end of the opposite bearing block and can be inserted into the bore of the same. For the purpose of assembling, the shoulders 12 are of slightly less diameter than the bores 7; and the arms 11 back of each shoulder are reduced to enable the inner edge of each block to pass around the shoulder, as indicated in Fig. 5, during the assembling operation.

After the trunnions have been inserted within the bores 7, they will be assembled by applying the bushings 16, the said bushings being screwed home until such time as the washers 26 are under proper compression and the proper clearance is provided between the inner ends of said bushings and the cooperating faces of the shoulders 12 to maintain a film of oil (supplied by the washers 26) between these parts, for lubrication, and to eliminate rattling.

To lock each bushing in place, I have provided the flange 18 thereof with marginal notches 18ª. Mounted on each block or arm adjacent to each such flange is a locking plate, the said plate being indicated generally at 29 and having a slot 30 concentric with the center of its bushing and being provided with a pair of lugs 31 which are adapted to enter two of such notches. Each plate is supported upon its arm by means of a screw 31 which is threaded into such arm and which is provided with a head 32 adapted to overlie the slot 30. Between the bolt head 32 and the plate 29 is a spring washer 33, which serves to prevent the screw from backing off.

One of the bushings of each set may be provided with a central aperture 34 for the introduction of lubricant into the hollow cross member, the said aperture being closed by a screw plug 35.

In Figs. 6 and 7 there is shown a modification of the construction for permitting the assembly of the cross member 9 with the bearing blocks. In this view, the blocks 5ª are not beveled on their inner faces, but the outer end of each block is shown as cut away at its inner face, as shown at 36, providing a slot through which the outer end of the trunnion of the cross member may be inserted into the bore 7ª. As a further aid to assembling without reducing the diameter, and hence the strength, of the cross-member trunnions, the outer end of each bore adjacent to the hub (1 or 2) is also shown as beveled, as indicated at 37; and to further facilitate such assembling, the outer end of each trunnion may be rounded off, as indicated at 38. It will ordinarily not be necessary to slot both blocks of each pair or to provide the bores of both blocks of each pair with the inclines. By slotting and beveling both blocks, the cross member may be assembled by inserting either trunnion of each pair into either bore of the corresponding bearing blocks.

By the construction shown and described herein, I have produced a joint which may be manufactured at a minimum expense, which comprises a minimum number of parts, but which is extremely durable and efficient and capable of withstanding all ordinary incidents of use.

The manner of constructing the bearings for the trunnions of the cross member not only enables these bearings to be formed with a minimum of expense, but insures extreme accuracy in the bearings, preventing the thrust of the trunnions against the inner and outer ends or corners of their bores, or against the outer checks or faces of the shoulders 12. By threading only the outer portion of each bushing and the outer portion of each bearing block bore, the unthreaded part of the bushing serves as a pilot in enabling the threads to engage and maintain perfect alignment. Furthermore, the distance from the inner face of each flange 18 to the inner end of the bushing is less than the distance from the seat 19 to the shoulder 12. This enables the bushing to be adjusted to compress the packing washer 26. I am enabled to provide integral hubs and bearing blocks and an integral cross member and to assemble the same conveniently, without the sacrifice of strength in either the cross member, the bearing blocks, or the yoke arms, I am also enabled to lubricate in a particularly efficient manner the bearing between each trunnion and its surrounding bushing.

In operation lubricant is supplied by centrifugal action from the well 10 of the cross member to the hollow trunnion arms and thence through the ports 14 and passageways 27 to the joint between each trunnion and its bushing and, by the washer 26, to the shoulder 12. The washer 22 retains oil supplied thereto by centrifugal action, such oil serving to lubricate the joint between the trunnion and the bushing until such time as the oil may reach such joint in the regular and continuous operation, by centrifugal action. Should the clearance between the inner face of a bushing and the outer face of a shoulder 12 be too great, then the seat 19 for the bushing flange 18 can be conveniently and quickly faced off, to provide suitable clearance between the bushing and the shoulder.

The washers 26 prevent the material escape of lubricant from the joints between the bushings and the trunnions and also furnish a limited but sufficient lubrication between the inner ends of the bushings and the shoulders, whereby scoring or galling of the parts is prevented and rattling is eliminated.

Having thus described my invention what I claim is:

1. In a universal joint, the combination of a pair of hubs each provided with arms having each an integral block provided with a bore, the inner end of one of said blocks being recessed at a point remote from its hub, whereby the distance between the portions of the bores which are remote from said hub is greater than the distance between the portions of the bores that are adjacent to said hub, and the outer end portion of the bore of one of said blocks being beveled outwardly adjacent to the hub, a cross member having trunnions adapted to be inserted in said bores, the outer ends of said trunnions being rounded or beveled, and bushings adapted to be mounted in said bores and to receive and form bearings for said trunnions.

2. In a universal joint, the combination of a pair of hubs each provided with arms having each an integral bearing block provided with a bore, the distance between the portions of the bores which are remote from their hub being greater than the distance between the portions of said bores that are adjacent to said hub, and the outer end portion of the bore of one of each pair of blocks being beveled outwardly adjacent to its hub, a cross member having trunnions adapted to be inserted in said bores, and bushings adapted to be mounted in said bores and to receive and form bearings for said trunnions.

3. In a universal joint, the combination of a pair of hubs each having arms provided each with an integral bearing block provided with a bore, the distance between the portions of the bores which are remote from said hub being greater than the distance between the portions of said bores that are adjacent to said hub, a cross member having trunnions adapted to be inserted in said bores, there being a shoulder at the inner end of each trunnion and said shoulder being rounded inwardly toward the central portion of such cross member, and bushings adjustably mounted in said bores and forming bearings for said trunnions and having their inner ends cooperating with said shoulders.

4. In a universal joint, the combination of a pair of hubs each having arms provided each with an integral bearing block provided with a bore, the distance between the portions of the bores which are remote from said hub being greater than the distance between the portions of said bores that are adjacent to said hub, a cross member having trunnions adapted to be inserted in said bores, there being a shoulder at the inner end of each trunnion and said shoulder being rounded inwardly toward the central portion of such cross member, the arms of each cross member between the shoulders and the central portion of such member being of less diameter than the bores of the bearing blocks, and bushings adjustably mounted in said bores and forming bearings for said trunnions.

5. A universal joint comprising a pair of hubs each having a pair of arms provided each with a bearing block, each bearing block being provided with a bore having its outer portion only provided with a thread, a cross member comprising arms having trunnions adapted to be inserted in said bores, and a bushing for each bore adapted to receive a trunnion and having its outer portion only provided with a thread for application to and adjustment along a bearing block bore, each bushing having a cap provided with a flange adapted to overlie its bearing block and each bearing block having a seat for such flange, each arm of the cross member being provided with a shoulder at the inner end of its trunnion, and packing material interposed between the inner end of each bushing and the shoulder adjacent thereto.

6. A universal joint comprising a pair of hubs each having a pair of arms provided each with an integral bearing block, each bearing block being provided with a bore having the outer portion thereof provided with a thread, a cross member having trunnions adapted to be inserted in said bores, and a bushing for each bore adapted to receive a trunnion and having its outer portion provided with a thread for application to and adjustment along a bearing block bore, each bushing having a cap provided with a flange adapted to overlie its bearing block and each bearing block having a seat for such flange, each arm of the cross member being provided with a shoulder at the inner end of its trunnion and cooperating with the inner end of the bushing in which said trunnion is mounted, a washer interposed between the inner end of each bushing and its cooperating shoulder, and means for supplying lubricant to the space between each trunnion and its bushing.

7. A universal joint comprising a pair of hubs each having a pair of arms provided each with an integral bearing block, each bearing block being provided with a bore having the outer portion thereof provided with a thread, a cross member having trunnions adapted to be inserted in said bores, outer face of a shoulder 12 be too great, ceive a trunnion and having its outer portion provided with a thread for application to and adjustment along a bearing block bore, each bushing having a cap provided with a flange adapted to overlie its bearing block and each bearing block having a seat for such flange, each arm of the cross member being provided with a shoulder at the inner end of its trunnion and cooperating with the inner end of the bushing in which said trunnion is mounted, and means for supplying lubricant to the space between each trunnion and its bushing and to the space between the inner end of each trunnion and its cooperating shoulder.

8. In a universal joint, the combination of a pair of hubs each having arms provided each with a bearing block provided with a bore, a capped bushing mounted in each bore, a cross member having trunnions mounted in said bushings, said cross member being hollow and there being a well provided in each bushing beyond the trunnion therein, a ring of capillary material in each well and extending across the joint provided between each bushing and its trunnion, and means for supplying lubricant by centrifugal action from said cross member to such joint at a point intermediate the ends of each trunnion.

9. In a universal joint, the combination of a hub having an arm provided with a bearing block provided with a bore, a capped bushing mounted in such bore, a cross member having a trunnion mounted in said bushing, said cross member being hollow and there being a well provided in such bushing beyond the trunnion therein, a ring of absorbent capillary material in such well and extending across the joint provided between the bushing and its trunnion, and means for supplying lubricant by centrifugal action from said cross member to such joint at a point intermediate the ends of said trunnion.

10. In a universal joint, the combination of a hub carrying a bearing block provided with a bore, the said bore being threaded, a bushing threaded in said bore and provided with a flange adapted to engage a portion of the bearing block surrounding the bore, a cross member having a trunnion mounted in said bushing and provided with a shoulder, and a packing ring interposed between the inner end of said bushing and said shoulder, the distance from the inner face of the flange on said bushing to the inner end of such bushing being less than the distance from the shoulder to the seat on the bearing block for such flange.

In testimony whereof, I hereunto affix my signature.

WILLIAM H. THIEMER.